(Model.) T. H. HOVENDEN. 4 Sheets—Sheet 1.
CALENDAR.

No. 254,015. Patented Feb. 21, 1882.

Attest:
R. F. Barnes
L. W. Luly

Inventor:
Thomas H Hovenden,
By Ellis Spear
Attorney

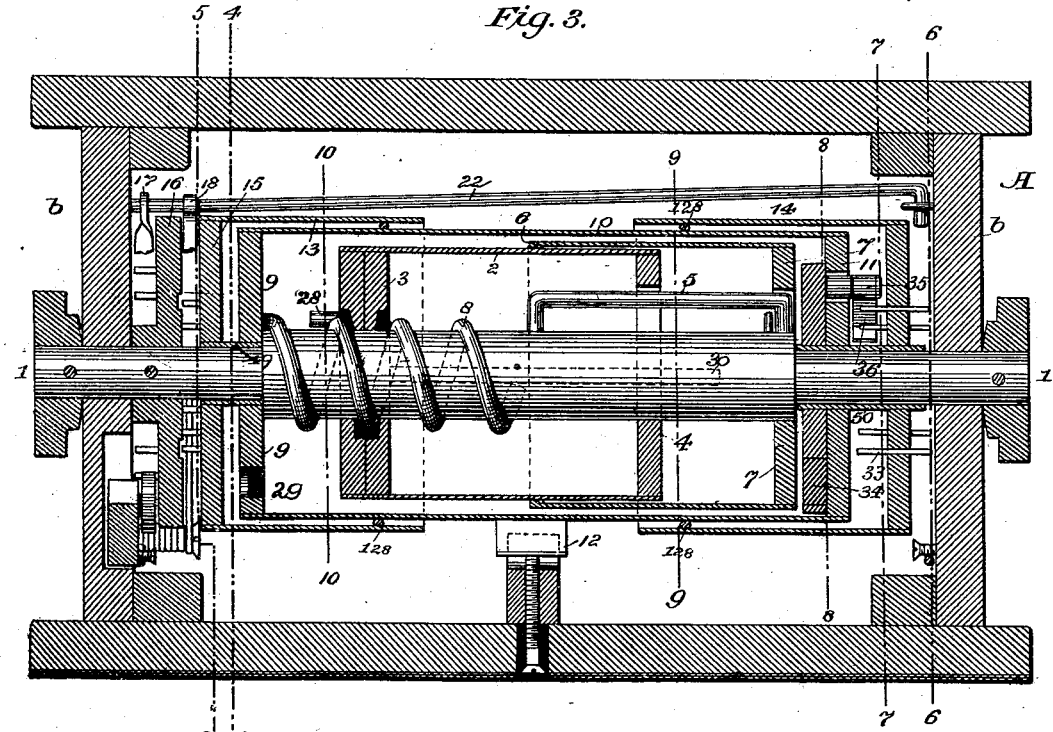
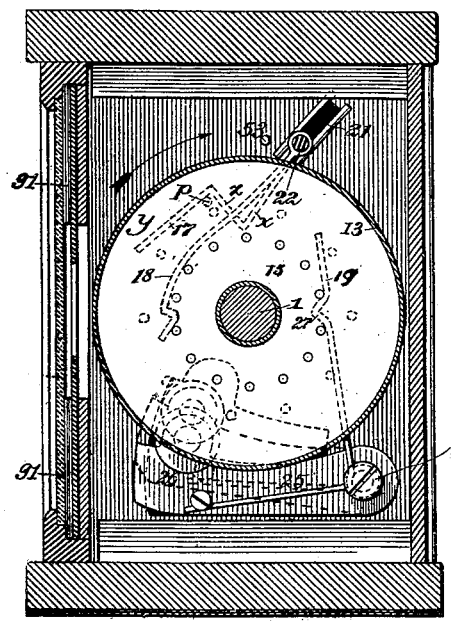
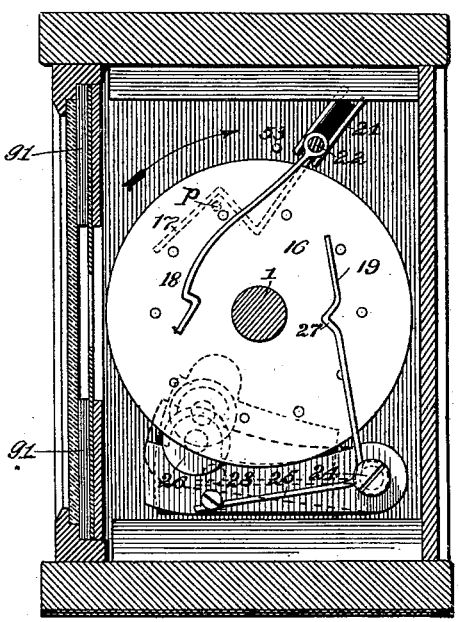

(Model.)

T. H. HOVENDEN.
CALENDAR.

No. 254,015.  Patented Feb. 21, 1882.

Attest:
R. F. Barnes
L. W. Seely

Inventor:
Thomas H. Hovenden.
By Ellis Spear
Attorney (Model.)

4 Sheets—Sheet 4.

T. H. HOVENDEN.
CALENDAR.

No. 254,015.                     Patented Feb. 21, 1882.

Attest
S. W. Luly
Frank Middleton

Inventor
Thomas H Hovenden
by Ellis Spear
Attorney

UNITED STATES PATENT OFFICE.

THOMAS H. HOVENDEN, OF INGERSOLL, ONTARIO, CANADA.

CALENDAR.

SPECIFICATION forming part of Letters Patent No. 254,015, dated February 21, 1882.

Application filed July 14, 1881. (Model.)

*To all whom it may concern:*

Be it known that I, THOMAS H. HOVENDEN, of Ingersoll, in the Province of Ontario and Dominion of Canada, have invented a new and useful Improvement in Time-Indicators; and I do hereby declare that the following is a full, clear, and exact description of the same.

My invention relates to perpetual calendars of that class in which the letters and figures which indicate the month and day of the week or month are carried on a moving surface and exposed to view at apertures.

The objects which I have in view are, first, to provide an apparatus which will indicate the day of the week, the month, and the day of the month, and could be manipulated at will by a single knob to bring into proper position, separately or together, either the name or number of the day or the name of the month; second, to present letters and figures of large size with a margin about them of proper extent within the apertures of the fixed case, and at the same time to keep the apparatus within reasonable limits as to size; third, to give the parts positive step-by-step movement under control of the operator, with yielding stops between the steps; fourth, to provide simple moving mechanisms for the apparatus not liable to get out of order; fifth, to arrange a fixed yearly calendar or series of yearly calendars in convenient connection with the movable words and figures indicating days and months; and, finally, to produce an effective and practical calendar within reasonable limits as to cost.

My invention consists in devices and combinations hereinafter fully explained, and particularly indicated in the claims.

Hereinafter I have fully described and in the accompanying drawings illustrated what I consider the best means for carrying my invention into practical effect.

Figure 1:
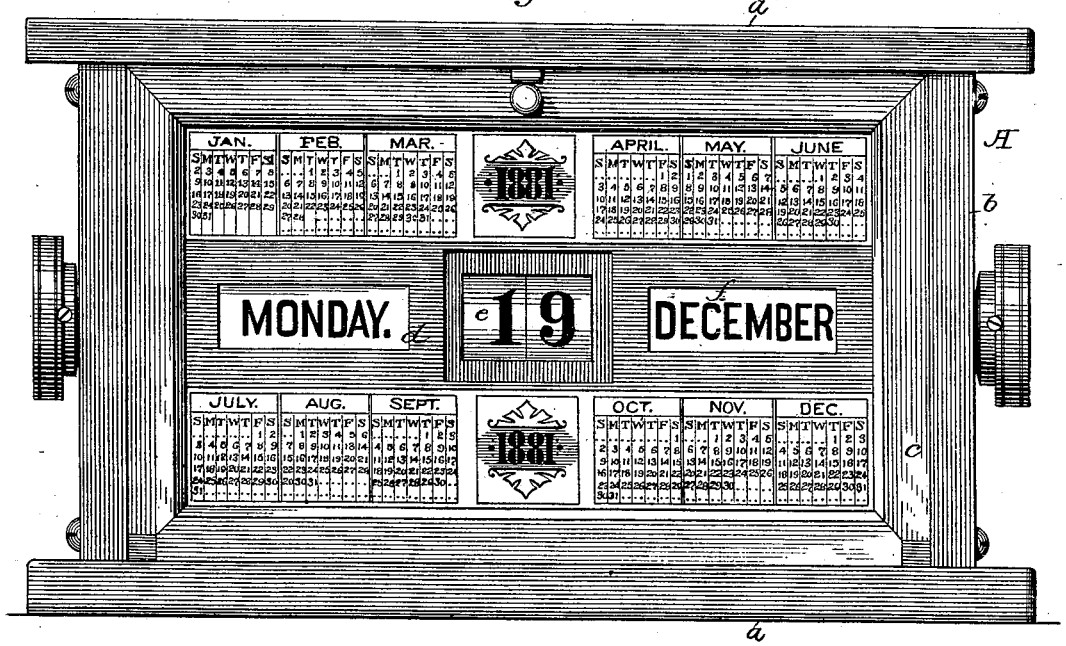
Figure 2:
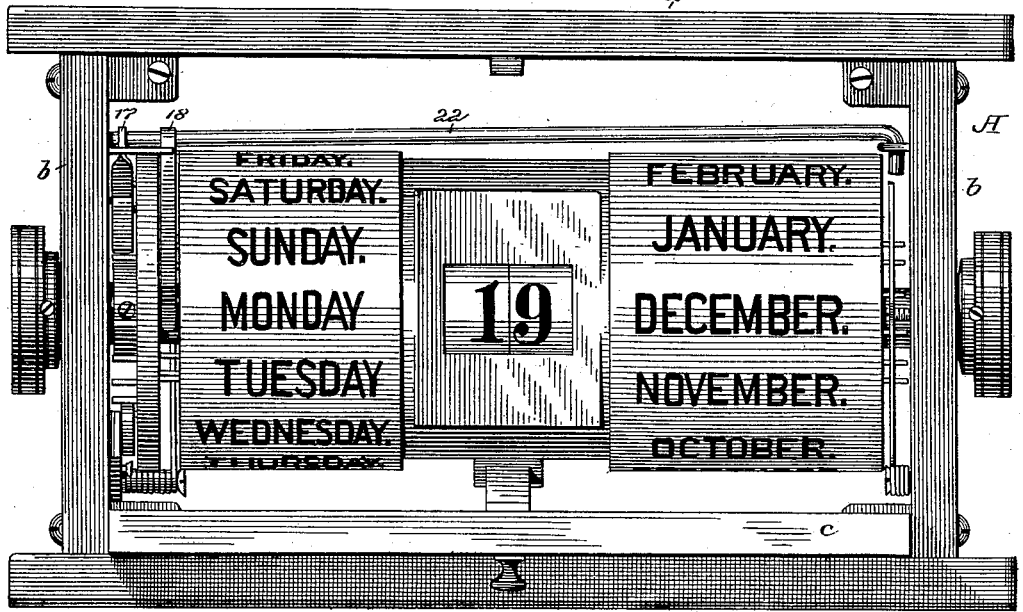
Figure 6:
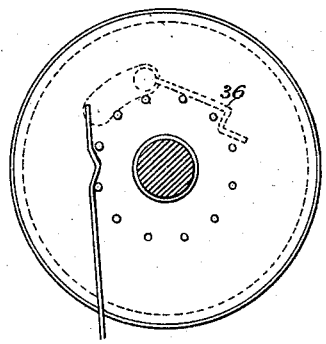
Figure 7:
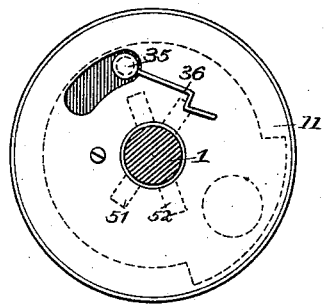
Figure 8:
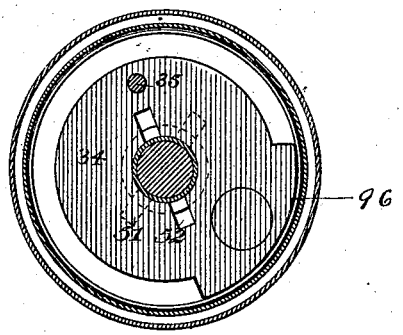
Figure 9:
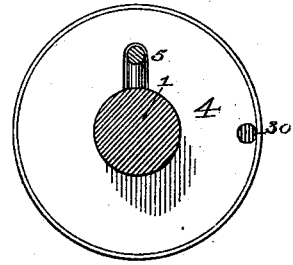
Figure 10:
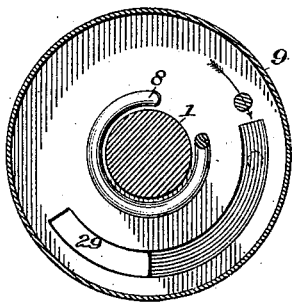
Figure 11:
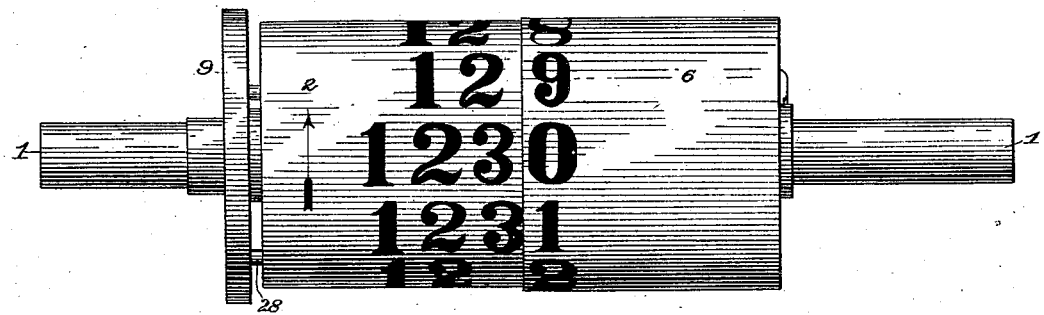
Figure 12:
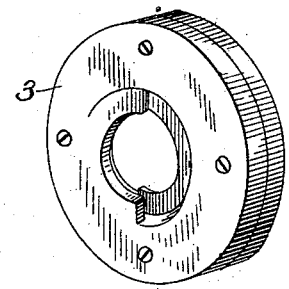

In these drawings, Figure 1 represents a front elevation, and Fig. 2 a front elevation with the front of the case lowered; Fig. 3, a central vertical longitudinal section. Fig. 4 is a cross-section on line 4 4; Fig. 5, a cross-section on line 5 5; Fig. 6, a cross-section on line 6 6. Fig. 7 is a section on line 7 7, Fig. 3; Fig. 8, a section on line 8 8, Fig. 9 on line 9 9, and Fig. 10 on line 10 10, of same figure. These cross-sections are all views looking to the left. Fig. 11 represents the two numeral-cylinders upon the shaft. Fig. 12 illustrates the method of forming the spiral path in the head of the cylinder 2.

In these drawings, the box or case in which the working parts are contained is shown at A. This case may be made of any suitable material and with any suitable kind or amount of ornamentation. As shown, it consists of top and bottom pieces *a*, end pieces, *b b*, a back sliding in grooves, and a hinged front, *c*, composed of a frame holding a pane of glass, behind which are apertures *d e f*, in substantially the same horizontal plane, said apertures being designed to expose the names of the days and months and the number of the day, the latter being at the central aperture, with the months upon the right and the day upon the left. This front is hinged preferably at the bottom, and is held at the top by a spring-catch; but ordinarily it is not necessary that it should be opened.

A shaft, 1, has its bearings in the end pieces, *b b*, extending through both, and is provided with knobs at the ends outside the end pieces, by means of which it may be turned. Other devices may be substituted for the knobs; but these are the simpler and more convenient. Supported upon this shaft is a cylinder, 2, provided with heads 3 4, having holes centrally therein, through which the shaft passes. Cylinder 2 is free to slide upon the shaft, but is made to turn therewith by means of a spline, 5, fixed in the shaft and projecting into a slot in the head 4. This spline 5 is made of wire, in the form of an elongated staple, in order to give larger radial extension with lightness, the horizontal part of the wire spline acting in the slot with less of lost motion in proportion as it is distant from the center. This gives the desired result without the necessity for close and accurate fit of the parts.

The cylinder 2 carries spirally-arranged decimal figures on its periphery, hereinafter to be described. Outside of this is another cylinder, 6, provided with a single head, 7. This cylinder is formed preferably of thin pasteboard, and fits as closely upon that first described as may be consistent with free and easy movement of one upon the other. In order to prevent too much friction, a bead may be formed at the end of cylinder 6 by a narrow strip of paper or pasteboard, the bead alone bearing on the inner cylinder. The cylinder 6 is stationary upon the shaft, being fixed in the position shown in Fig. 3, so that the cylinder 2, as it moves back and forth, telescopes within cylinder 6. Numerals from 1 to 0, inclusive, which occupy the unit place of the numbers representing the day of the month, are arranged in direct line around the periphery of cylinder 6, near the open end thereof. These figures therefore, arranged peripherally on the open end of cylinder 6, occupy ten equal spaces. Upon the cylinder 2 are arranged another series of figures in ten corresponding longitudinal spaces, each space being occupied by the numerals 1 2 3, arranged in the order stated from left to right. The columns of these figures, however, are arranged spirally upon the cylinder, as shown in Fig. 11. These figures are squarely arranged in the lines, and when the cylinder is in place upon the shaft and is made to telescope in cylinder 6 the lines of figures upon cylinder 2 are in line with those upon the periphery of cylinder 6. The relative arrangement of these figures upon the cylinders is such that when the inner cylinder is advanced into the outer all the figures upon the said inner cylinder are covered, and only the figures on the outer appear at the central aperture in the front of the case.

It will be observed by reference to Fig. 11 that the first unit in the spiral column of units on the moving cylinder is opposite the 0 in the fixed cylinder. Therefore, when the moving cylinder is drawn out the first unit emerges opposite the 0 and appears in proper place upon its left as the decimal figure, to represent the number 10. The next unit of the spiral column appears in its proper order opposite the unit on the fixed cylinder, to represent 11, and so on down to and including the number 19, where the spiral column of units ends and the column of twos begins, and as the telescoping cylinder is farther drawn out the figure 2 in the same line as the figure 1 first exposed assumes its place to the left of the 0 and represents the number 20. The cylinders at this point have made two complete revolutions. From the point where the cylinders present the number 20 at the central aperture the movement goes on through the numbers from 20 to 30 in the same way, one-tenth revolution of the cylinder in the direction of the arrow, Figs. 4, 5, and 11, being sufficient to turn the number last exposed completely out of sight and to bring into place in the aperture the next succeeding number, and at the same time to complete the movement of the decimal figure to the left, so as to uncover it fully from the cylinder 6. At the end of this revolution the number 30 will be exposed by the uncovering of the figure 3 first in the spiral column of threes, beginning at the termination of the spiral columns of twos. Manifestly there need be but two of the figures 3 to form the numbers 30 and 31, that being the largest record for the days of any month.

The requisite spiral direction is given to the cylinder 2 by means of the spiral rod 8, which is fixed in the head 9, and encircles the shaft, as shown in Fig. 3, and which the head 3 traverses while riding on the shaft. It will be apparent that, the spiral being fixed and the cylinder 2 rotated by the shaft through the spline 5, it (cylinder 2) is advanced into or retracted from the cylinder 6, it being understood that the cylinder 6 revolves with the shaft also. The pitch of the spiral 8 is the same as that of the columns of figures heretofore described upon the cylinder 2.

The head 3 of cylinder 2 has an approximately spiral bearing-surface on the shaft, and encircles it by one or about one turn. The ends of said spiral bearing-surface saddle the spiral rod, and on rotation of the cylinder traverse it. One convenient mode of forming this spiral or approximately spiral bearing-surface saddling the spiral rod, as explained, is shown in Fig. 12, and consists in making it out of two disks, each provided with a bearing-surface on shaft for half or about half its circumference, and putting them together in reversed positions, a path for them to saddle the spiral being formed at one of the points, where the ends meet or overlap for the spiral rod to pass through. At the opposite points, where the other ends meet, they can be beveled or cut away, if required, to allow full clearance for the adjoining turns of the spiral rod.

It is only necessary in setting up these cylinders within the case to arrange them so that the figure 1 upon the cylinder 6 will be opposite the central aperture in case or shell 10, while the figures in the left-hand spiral column are obscured by movement such a distance from the edge of the cylinder 6 that one revolution which would bring the 0 in front of the central aperture in case or shell 10 would also bring out the first unit of the spiral column into its proper place by the side of the 0. I am aware that types have been spirally arranged on a printing-cylinder for analogous purpose, as shown in patent granted by the United States, No. 118,509, of 1871, and my invention does not include, broadly, spirally-arranged figures or letters on the periphery of a cylinder having longitudinal and rotary movement.

The shell or case in which is made the central opening is shown at 10. It is supported on the shaft by the head 9, heretofore referred to, and by the head 11 at the other end. The shaft passes loosely through these heads, and the case or shell is held from turning and also slightly elevated from the shaft by means of the foot 12, Fig. 3, fixed centrally to the shell, and resting on an adjusting-screw in a slotted block attached to the bottom of the box, the slot in the block preventing the turning of the cylinder. It will be understood that only the central aperture is in this cylindrical shell or case 10. This case is preferably formed of tin; but obviously any other thin material of sufficient strength will serve the purpose. A plain rectangular plate is placed about the opening, and extends a sufficient distance right and left and upward and downward to form a part of the face of the central opening in the hinged front.

The parts heretofore described, it will be observed, serve only to carry and display the numbers indicating the days of the month, and these are moved directly by the shaft. To carry and display the record of the day of the week and that of the month, two other cylinders are provided. Of these, that marked 13 carries the day-record. It is preferably a paper or pasteboard cylinder, and is carried on a wheel, 15, loose on a sleeve on the shaft 1 of the case. There are two series of week-records, and consequently fourteen spaces, into which the periphery of the cylinder is divided. These names of the days of the week are arranged in a column running directly around the cylinder, each name in line parallel with the axis of the cylinder. The two series are used to make the whole number (14) approximate as closely as possible to the number of spaces or divisions in the month-cylinders heretofore described. The numbers are sufficiently near to render it easy for the day and month names to be brought opposite the day-numbers by movement of the numeral-cylinders and shaft. The movement of the cylinder 13 is effected by means of a wheel, 16, fixed on the shaft, and connected to the cylinder by means of push and pull pawls of special construction.

It may be here stated that these special requirements exist, viz: that the rotation of the shaft 1 (which is the prime mover of all the mechanism) shall revolve the cylinder 13 step by step and more slowly than the shaft and daily-number cylinder, for the reason that the spaces on the former are more in number than those of the latter; further, that the mechanism shall permit the shaft and numeral-cylinder to turn freely backward without turning the day-name cylinder; and, finally, the securing of the perfect working of the parts. These special objects are all accomplished by the pawls 17 and 18 acting in connection with annular rows of pins on the wheels 15 and 16.

It will be borne in mind that wheel 16 is fixed on the shaft and turns with it like the cylinders carrying the numbers; but the cylinder carrying names of the days is loose.

The wheel 16 is provided with an annular row of pins, ten in number, projecting toward the end of the case. These in turn push the pawl 17, which raises the swinging rod 22, and this pulls on the pawl 18, pivoted like 17 on the said rod.

The shape of the pawl 17 is peculiar, as well as its location, and this shape and location are fully illustrated in Figs. 4 and 5. The illustration, with description of the movements, will suffice for a complete understanding of this part of the apparatus.

As the shaft is turned, carrying number-cylinder advancing the numbers in their increasing order, the wheel 16, revolving with said shaft, causes each pin in turn to strike the face of the offset $z$, which is approximately at right angles to a line drawn from the pivot through the center of $x$. As the pin advances it pushes the pawl upward and backward, moving first nearly in line with the slot 21, and afterward more and more across that line, the result of the circular movement of the pin and the direct line movement of the pawl and rod being that the latter moves a less distance than the former; but the advancing pin rides under the apex of the pawl, whose sides $x$ and $z$ meet, and the pawl then falls into the next space. In falling it moves in the line in which it was raised, the lower end $y$ resting on a pin, $p$, (fixed in the end of the case just above the path of the circular row of pins,) and the other end being supported by its pivoting-rod 22.

It will be clear from an inspection of the drawings that in the reverse movement of the shaft 1, with its directly-connected cylinders and wheel 16, the side $y$ of the pawl will ride freely over the pins, and no movement of the rod 22 takes place.

The pull-pawl is of ordinary construction. It works on a circular row of pins, fourteen in number, set in the head 15 of cylinder 13 and projecting toward wheel 16, the wheel and head forming a guide for the pawl, and in the same manner the wheel 16 and end of the box form a guide for the push-pawl. It will be apparent that when the pawl 17 and rod 22 rise they move the pawl 18 and the cylinder 13 a single step.

It will be borne in mind that to bring a new number into line the shaft and cylinder 2 and 6 make a tenth ($\frac{1}{10}$) revolution; but to bring a new name into line, only one-fourteenth ($\frac{1}{14}$) revolution is required of cylinder 13.

As the cylinder 13 is moved by the shaft which carries positively the number-cylinders, a certain amount of motion must be lost in this connecting mechanism. Some of this is lost by the peculiar construction and arrangement of the pawl and its connections, heretofore described, and some necessarily in the engagement of the pawl 18 with its pins. Further, difference of movement, and the exact amount of it, is obtained by setting the pins in the head 15 of cylinder 13 in a circle smaller than those of wheel 16.

A pin, 53, is set in the end of the box just above the pawls, to prevent their displacement should the box happen to be turned upside down.

The rod 22 has been found a convenient mode of suspending the pawls, said rod resting at one end in the slot which guides it and the pawls, and at the other in a staple, as shown in Fig. 3. Other means, however, may be de vised for connecting, holding, and directing the pawls. Yielding stop mechanism is desirable for all the cylinders. That for cylinders 2 and 6 and the shaft acts directly upon the wheel 16, and is shown in Figs. 4 and 5. It consists of a pawl, 23, pivoted on stud 24. It carries a small pulley, 26, adapted to pass nearly half-way into the space between the pins on wheel 16 and to ride over such pins. It is pressed upward by a horizontal arm of spring 25, and when the shaft 1 is turned gives it a step-by-step motion, but yields enough to permit free continuous motion.

The pawl 23 and its pulley may be located partly in a recess in the end of box.

The upright end of spring 25 is provided with a double bend, 27, adapted to fit between the pins of the disk 15, holding it by a yielding stop with the same action as the pawl; but in the latter the pulley is desirable in order to give greater accuracy to the positive fixed wheel and shaft.

Small ribs 128, preferably of wire, placed around the case 10, serve as bearings for the cylinders 13 and 14 and lessen the friction.

The cylinder 14, placed over the other end of the case 10 and carrying the names of the months, corresponds in shape and location to the cylinder 13, except that it is a trifle longer; but obviously it requires only one movement (or movement one space) each month, and that at the beginning of the current number of the days thereof.

It will be borne in mind that the day-number cylinder turns to expose the numbers in regular order, and is then arrested by a positive stop, (hereinafter to be described,) and must then be turned back. My construction contemplates the turning backward of this double cylinder 2 and 6 until the zero-point is brought opposite the aperture in case 10, when motion in that direction is arrested. In the form shown in Figs. 3, 4, and 5 the arresting devices are simple pins fixed in the end of telescoping cylinder, and which bring up, one against a fixed shoulder on the inside of the head of the case 10 and the other against a weighted disk, hereinafter described. That pin which arrests the advance of the number-cylinder is indicated at 28, Figs. 3 and 11. As the cylinder 2 advances to the left this pin projects into a groove, 29, in head or disk 9 and brings up against a shoulder at the end thereof, the shoulder and pin being so arranged that they come into contact when the greatest day-number, 31, of any month is opposite the central aperture. If the month on record be a shorter month, the operator stops at the proper number and from that point turns back; or, if through inadvertence he advance the cylinder too far, it is easy to readjust it, since he can turn back the number-cylinder continuously, and by a back-and-forth movement through one or more steps or spaces he can adjust the week-day cylinder, if displaced. The pin 30 in the head 4 of the telescoping cylinder, advancing with the backward movement of the cylinder, passes through the head 7 of cylinder 6 and, in like manner as pin 28, strikes against a shoulder on a weighted wheel, 34, just inside the head 11 of the case. This weighted wheel 34 is loose on a sleeve of the head of the case 10, and has a pin, 35, projecting through a slot in said head, carrying a pawl which operates on pins in the inner side of the head of the month-cylinder, said slot being curved on a radius of which the axis is the center, and is of a length sufficient to give necessary motion to the pawl. The weighted wheel has an offset, 96, against which the pin may strike. The weight is on the same side with the offset, and preferably in it, and the pawl is so arranged on the weighted wheel that the weight, when dropping freely, shall throw the pawl to the rear ready for engagement with the pins of the month-cylinder. When the number-cylinders, therefore, are turned back toward 0, the stop-pin is brought into contact with this offset. It is so arranged as to strike it when the figure 1 commences to pass out of sight, and completes the motion when the 0 is in place, and the movement of the shaft and number-cylinders necessary to expose the 0 causes the pin in said number-cylinder to turn the weighted disk and move the pawl and month-cylinder one step forward, and then to stop by reason of the pin carrying the pawl coming against the end of the slot. After that the number-cylinders are advanced by reverse movement through the numbers of the month in proper order without again moving the month-cylinder, since the pin does not strike the disk in its subsequent revolutions, being drawn away by the left-hand movement of the cylinder 2.

The pins 33 are twelve in number, equidistant, and the pawl advances the cylinder one-twelfth of its circumference by each action. These pins project through the wheel and are acted upon on the outside by a wire spring-pawl, as shown in Fig. 6, which acts as a yielding stop in the same manner as that to the day-of-the-week cylinder before described. These yielding stop-pawls last mentioned are made preferably in the shape shown, the double-inclined projection serving more accurately to hold the wheel in correct position and center the indicating-word at the apertures.

The arrangement of the weighted disk, adapted to oscillate with its pawl sufficiently to move the month-cylinder one-twelfth of a revolution, enables the operator to readjust the record whenever it happens to be disarranged. By repeatedly turning the number-cylinder back and forth from 1 to 0 the month-cylinder can be revolved to any point desired.

I have found it well to mount the heads of the case on sleeves 49 and 50. The sleeve 50 affords a simple and secure mode of connecting the weighted disk to the head. For this purpose ears 51 are formed on the inner end of the sleeve, bent outward at right angles thereto, and fitted to pass through slots 52 in the weighted disk, there being space left between the ears and the head to admit the disk and permit it to turn freely on the sleeve. The disk is turned aside, and the pawl-carrying pin, inserted through its proper slot, prevents the ears and their slots from registering with each other.

On the front of the apparatus I have arranged in special and convenient relation to the moving record a fixed calendar, (represented at 91, Figs. 4 and 5.) This is printed on two slips of paper, the upper including the first half and the lower the latter half of the year, the year being preferably in central position in each. They are set in a light frame supporting an opaque front, in which the horizontally-arranged apertures are made. This light frame is set removably into the hinged frame which carries the glass. I use a series of these, one placed underneath the other in proper order, so that one may be removed when out of date.

An advantage arises from dividing the year into periods of six months on the slips, since the upper strip of one year may be removed before that year has expired, leaving the first six months of the next year exposed, so that in the last part of the year the record of the next ensuing year may be partly visible.

Records for any number of years desired may be placed one underneath another. I have attached them by the edge next the frame, so that they may be turned up and the calendar for any future year examined.

The old calendars may be folded when removed from their connections, held by a clip, and placed in the bottom of the box underneath the cylinders.

I am aware that a card-board having a fixed calendar on each side has been combined with a box and moving record at the central opening, as in patent granted by the United States, No. 171,227, of 1875, and do not claim so broadly as to include such combination.

The operation of the apparatus has been explained with sufficient fullness in connection with the description of the parts. It may be necessary only to add that the record, when disarranged, may be brought into proper order by first turning back the shaft and number-cylinders to 0, when, by oscillations from 0 to 1, the proper month may be represented at the aperture. Afterward the shaft is turned forward to the proper number, and the name of the day required may be brought into alignment, as heretofore explained.

Having thus described my invention, what I claim as new, and desire to secure by Letters Patent, is—

1. In a calendar, a cylinder having a series of unit figures, from 1 to 0, inclusive, arranged in direct line around its periphery, in combination with a cylinder telescoping therewith and provided with a spirally-arranged series of numerals, adapted to act as decimal figures, with the aforesaid unital figures, substantially as described.

2. The described series of calendar-slips, each series representing six months of successive years, in proper order, one above and the other below the line of apertures, said slips being suitably attached to the front or frame, substantially as described.

3. The cylinders carrying numerals indicating days of the months, in combination with a cylinder having the names of the days of the week, and with intermediate connecting mechanism, substantially as described, whereby the said numeral-cylinder carries the name-cylinder step by step in its advance, but leaves it undisturbed in reverse movement, as set forth.

4. The cylinders carrying numerals indicating days of the month, in combination with cylinders having names of the days and months, respectively, and with intermediate connecting mechanism, as described, whereby advance only of the numeral-cylinders moves the day-name cylinder, and reverse movement only of the same moves the month-name cylinder, as set forth.

5. The numeral-carrying cylinders, in combination with the cylinder carrying the names of the months, and with pawl and stop mechanism, as described, whereby the last backward movement only of the numeral-cylinders moves the month-cylinder one step, as set forth.

6. In a calendar, and in combination, cylinders carrying on their peripheries numbers of the days of months rotated by positive movement of shaft, a cylinder carrying names of the days, and intermediate mechanism, substantially as described, between the shaft and name-cylinder, adapted to transmit to the said name-cylinder an amount of motion varied from that of the shaft.

7. In combination, the cylinder 6, fixed on shaft 1, the cylinder 2, connected to shaft by spline, and the fixed spiral 8, substantially as described.

8. In combination, the fixed case 10, having heads 9 and 11, and central opening, the cylinder 6, fixed to shaft 1, the cylinder 2, telescoping therein, and the spiral 8, as set forth.

9. In combination, cylinder 6, fixed to shaft, cylinder 2, telescoping therein, fixed case 10, and cylinder 13, carrying the names of the days of the week and operated from the shaft by the push and pull pawls, substantially as described.

10. The cylinders 2 and 6 and the fixed case 10, all arranged as described, in combination with the wheel 16, shaft 1, and the connected pawls 17 and 18, substantially as described.

11. The combination of the rod 22, pawls 17 and 18, wheel 16, and head 15, both provided with pins, as set forth.

12. The wheel 16 and head 15, provided with pins, as described, in combination with the connected push and pull pawls 17 and 18 and the yielding stop-pawls, as described.

13. In a calendar, the combination of the fixed cylinder carrying the unit figures, telescoping cylinder carrying the spirally-arranged decimal figures, the stop pin or pins in the head of the telescoping cylinder, and the shoulders, as described, adapted to arrest the rotation of the telescoping cylinder, all as set forth.

14. The head 11 of the fixed case 10, slotted as described, in combination with weighted wheel 34 and pawl carried thereon by pin extending through slot in head 11 and connecting with pins in the head of cylinder 14, substantially as described.

15. In combination with a cylinder having characters arranged spirally upon its surface, and with a fixed case having openings to display such characters, the revolving shaft, fixed spiral rod surrounding said shaft, and the cylinder splined to the shaft, its head having a hole adapted to the shaft, and a surface bearing on the shaft, approximately spiral, said surface being adapted to pass between the coils, and the overlapping or meeting ends of said spiral bearing-surface saddling closely the spiral rod, all the parts being combined in a calendar and operating substantially as described.

In testimony whereof I have signed my name to this specification in the presence of two subscribing witnesses.

THOS. H. HOVENDEN.

Witnesses:
L. W. SEELY,
F. L. MIDDLETON.